(12) United States Patent
Achan et al.

(10) Patent No.: US 11,194,875 B2
(45) Date of Patent: Dec. 7, 2021

(54) SYSTEMS AND METHODS FOR WHOLE PAGE PERSONALIZATION

(71) Applicant: Walmart Apollo, LLC, Bentonville, AR (US)

(72) Inventors: Kannan Achan, Saratoga, CA (US); Venkata Syam Prakash Rapaka, Cupertino, CA (US); Evren Korpeoglu, Sunnyvale, CA (US); Shirpaa Manoharan, Santa Clara, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 201 days.

(21) Appl. No.: 16/525,298

(22) Filed: Jul. 29, 2019

(65) Prior Publication Data

US 2019/0354563 A1   Nov. 21, 2019

Related U.S. Application Data

(63) Continuation of application No. 15/420,757, filed on Jan. 31, 2017, now Pat. No. 10,366,133.

(51) Int. Cl.
*G06F 16/00* (2019.01)
*G06F 16/9535* (2019.01)
(Continued)

(52) U.S. Cl.
CPC ...... *G06F 16/9535* (2019.01); *G06F 16/9538* (2019.01); *G06F 16/9577* (2019.01); *G06Q 30/00* (2013.01); *G06Q 30/0241* (2013.01); *G06Q 30/0277* (2013.01); *H04L 67/02* (2013.01); *H04L 67/306* (2013.01)

(58) Field of Classification Search
CPC .. G06F 16/9535; G06F 30/20; G06F 16/9538; G06F 16/9577; G06Q 30/0241; G06Q 30/0277; G06Q 30/00; H04L 67/02; H04L 67/306
See application file for complete search history.

(56) References Cited

U.S. PATENT DOCUMENTS 10,002,368 B1 * 6/2018 Els ..................... G06Q 30/0249
2002/0002538 A1   1/2002 Ling
(Continued)

OTHER PUBLICATIONS

Chen et al., An Optimization Model for Product Placement on Product Listing Pages. (Year: 2014).*
(Continued)

*Primary Examiner* — Syed H Hasan
(74) *Attorney, Agent, or Firm* — Bryan Cave Leighton Paisner LLP

(57) ABSTRACT

A method can include modeling a webpage as a random field. The random field can include an undirected graph including two or more nodes and one or more edges. A goodness function can be associated with one or more webpage elements. Each edge of the one or more edges can include a compatibility function based at least in part on the one or more goodness functions of two different nodes of the two or more nodes. The method also can include determining a probability of the webpage having exceeded a predetermined threshold based at least in part on one or more of the compatibility functions of the one or more edges. Other embodiments are disclosed.

20 Claims, 6 Drawing Sheets

500

505 – Modeling a webpage as a random field, wherein the random field comprises an undirected graph, the undirected graph comprising: one or more nodes; and one or more edges, each edge of the one or more edges is between two different nodes of the one or more nodes.

510 - Determining a probability of the webpage having exceeded a predetermined threshold based at least in part on the one or more compatibility functions.

515 - Determining a first placement of the one or more placements of a first webpage module of the one or more webpage modules.

520 - Determining a second placement of the one or more placements of a second webpage module of the one or more webpage modules.

525 - Facilitating a display of the webpage based at least in part on the probability of the webpage.

(51) Int. Cl.
    *H04L 29/08* (2006.01)
    *G06F 16/9538* (2019.01)
    *G06Q 30/02* (2012.01)
    *G06F 16/957* (2019.01)
    *G06Q 30/00* (2012.01)

(56) References Cited

U.S. PATENT DOCUMENTS

| | | | |
|---|---|---|---|
| 2003/0100931 A1 | 5/2003 | Mullett | |
| 2005/0125382 A1 | 6/2005 | Kamawat et al. | |
| 2005/0222989 A1* | 10/2005 | Haveliwala | G06Q 30/02 |
| 2008/0235162 A1 | 9/2008 | Spring | |
| 2010/0106595 A1* | 4/2010 | Baugher | G06Q 30/0243 |
| | | | 705/14.42 |
| 2012/0042232 A1* | 2/2012 | Brelsford | G06F 40/137 |
| | | | 715/206 |
| 2012/0284275 A1 | 11/2012 | Vadrevu et al. | |
| 2013/0047062 A1* | 2/2013 | McElfresh | G06Q 30/0269 |
| | | | 715/205 |
| 2014/0279993 A1 | 9/2014 | Bernhardt et al. | |
| 2015/0007064 A1* | 1/2015 | Givoni | G06F 16/958 |
| | | | 715/760 |
| 2015/0046841 A1 | 2/2015 | Sharon et al. | |
| 2015/0206199 A1* | 7/2015 | Zhang | G06Q 30/0277 |
| | | | 705/14.73 |
| 2016/0140130 A1 | 5/2016 | Smirnov et al. | |
| 2016/0140626 A1* | 5/2016 | Agarwal | G06Q 30/0276 |
| | | | 715/234 |
| 2016/0232575 A1 | 8/2016 | Kirti et al. | |
| 2016/0349928 A1 | 12/2016 | Li et al. | |
| 2019/0042981 A1 | 2/2019 | Bendfeldt | |
| 2020/0152184 A1 | 5/2020 | Henderson et al. | |
| 2021/0117935 A1* | 4/2021 | Fineman | G06Q 20/02 |

OTHER PUBLICATIONS

Elwany et al., The Layout Problem: Investigation and Aggregation of Artificial Intelligence and Optimization Techniques. (Year: 2006).*
Chung et al., "Deep Neural Network Using Trainable Activation Functions," Electronics and Telecommunications Research Institute, 2016.

* cited by examiner

500

505 – Modeling a webpage as a random field, wherein the random field comprises an undirected graph, the undirected graph comprising: one or more nodes; and one or more edges, each edge of the one or more edges is between two different nodes of the one or more nodes.

510 - Determining a probability of the webpage having exceeded a predetermined threshold based at least in part on the one or more compatibility functions.

515 - Determining a first placement of the one or more placements of a first webpage module of the one or more webpage modules.

520 - Determining a second placement of the one or more placements of a second webpage module of the one or more webpage modules.

525 - Facilitating a display of the webpage based at least in part on the probability of the webpage.

FIG. 5

SYSTEMS AND METHODS FOR WHOLE PAGE PERSONALIZATION

CROSS-REFERENCE TO RELATED APPLICATIONS

This application is a continuation of U.S. application Ser. No. 15/420,757, filed Jan. 31, 2017. U.S. application Ser. No. 15/420,757 is incorporated herein by reference in its entirety.

TECHNICAL FIELD

This disclosure relates generally to systems for whole page personalization, and related methods.

BACKGROUND

System bandwidth can become slow or bottlenecked when retrieving search results for a search query. Many times, when a user of a website, such as an eCommerce website, has difficulty finding an item, the user can conduct numerous user actions and/or item activities (e.g., clicking on one or more items or entering new search terms). These user actions and/or item activities can decrease the efficiency of a system by increasing the amount of item information retrieved from a database. The ability to personalize a webpage and/or website experience can decrease the demand on system resources and improve user experience. Accordingly, there is a need for systems and methods to provide for whole page personalization.

BRIEF DESCRIPTION OF THE DRAWINGS

To facilitate further description of the embodiments, the following drawings are provided in which:

FIG. 5 illustrates is a flowchart for a method, according to an embodiment.

Figure 1:
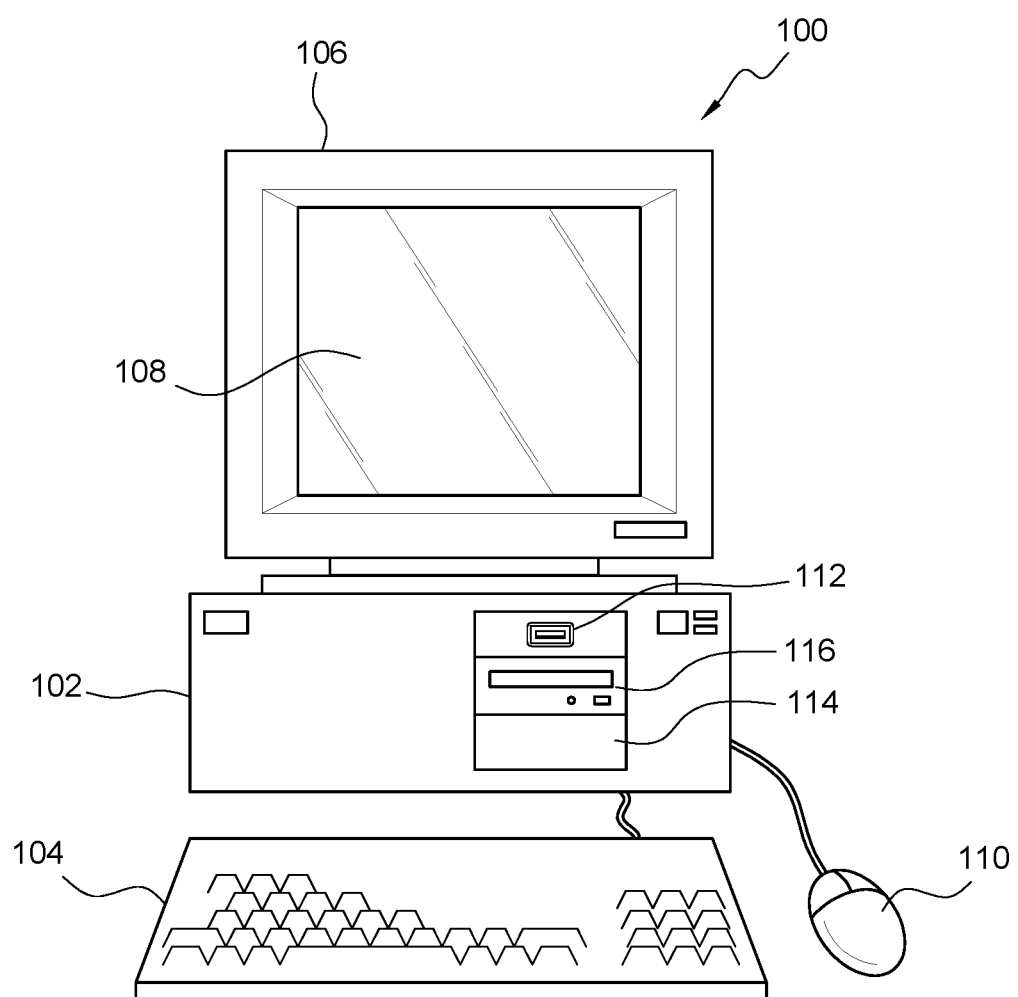
FIG. 1 illustrates a front elevation view of a computer system that is suitable for implementing at least part of a central computer system.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

Some embodiments include a system. In many embodiments, the system can comprise one or more processing modules and one or more non-transitory storage modules storing computing instructions configured to run on the one or more processing modules and perform acts. In many embodiments, the acts can comprise modeling a webpage as a random field, wherein the random field comprises an undirected graph. In some embodiments, the undirected graph can comprise one or more nodes and one or more edges, wherein each edge of the one or more edges is between two different nodes of the one or more nodes, each node of the one or more nodes comprises one or more placements on the webpage and a goodness function of one or more goodness functions associated with one or more webpage modules, and each edge of the or one more edges comprises a compatibility function based at least in part on the one or more goodness functions of the two different nodes of the one or more nodes associated with each edge of the one or more edges. In many embodiments, the acts further can comprise determining a probability of the webpage having exceeded a predetermined threshold based at least in part on the one or more compatibility functions by determining a first placement of the one or more placements of a first webpage module of the one or more webpage modules and determining a second placement of the one or more placements of a second webpage module of the one or more webpage modules. In various embodiments, the one or more webpage modules can comprise an advertisement, a search recommendation, or an item recommendation. In some embodiments, the acts further can comprise facilitating a display of the webpage based at least in part on the probability of the webpage.

Many embodiments can comprise a method. In some embodiments, the method can comprise modeling a webpage as a random field, wherein the random field comprises an undirected graph. In some embodiments, the undirected graph can comprise one or more nodes and one or more edges, wherein each edge of the one or more edges is between two different nodes of the one or more nodes, each node of the one or more nodes comprises one or more placements on the webpage and a goodness function of one or more goodness functions associated with one or more webpage modules, and each edge of the or one more edges comprises a compatibility function based at least in part on the one or more goodness functions of the two different nodes of the one or more nodes associated with each edge of the one or more edges. In many embodiments, the acts further can comprise determining a probability of the webpage having exceeded a predetermined threshold based at least in part on the one or more compatibility functions by determining a first placement of the one or more placements of a first webpage module of the one or more webpage modules and determining a second placement of the one or more placements of a second webpage module of the one or more webpage modules. In various embodiments, the one or more webpage modules can comprise an advertisement, a search recommendation, or an item recommendation. In some embodiments, the acts further can comprise facilitating a display of the webpage based at least in part on the probability of the webpage.

A number of embodiments comprise a method. In some embodiments, the method can comprise receiving a search query from a user and modeling a webpage as a random field. In many embodiments, the random field can comprise an undirected graph. In some embodiments, the undirected graph can comprise one or more nodes and one or more edges, wherein each edge of the one or more edges is between two different nodes of the one or more nodes, each node of the one or more nodes can comprise one or more placements on the webpage and a goodness function of one or more goodness functions associated with one or more webpage modules, and each edge of the or one more edges comprises a compatibility function based at least in part on the one or more goodness functions of the two different nodes of the one or more nodes associated with each edge of the one or more edges. In many embodiments, the method further can comprise determining a probability of the webpage having exceeded a predetermined threshold based at least in part on the one or more compatibility functions by determining a first placement of the one or more placements of a first webpage module of the one or more webpage modules and determining a second placement of the one or more placements of a second webpage module of the one or more webpage modules. In some embodiments, the one or more webpage modules can comprise an advertisement associated with the search query a search recommendation with the search query, or an item recommendation with the search query. In various embodiments, the method further can comprise facilitating a display of the webpage based at least in part on the probability of the webpage.

A number of embodiments include a system. The system can include one or more processors and one or more non-transitory computer-readable media storing computing instructions configured to run on the one or more processors and perform certain acts. The acts can include modeling a webpage as a random field. The random field can include an undirected graph including two or more nodes and one or more edges. Each node of the two or more nodes can include one or more placements on the webpage and can include a goodness function of one or more goodness functions associated with one or more webpage elements. Each edge of the one or more edges can include a compatibility function based at least in part on one or more goodness functions of two different nodes of the two or more nodes associated with each edge of the one or more edges. The acts also can include determining a probability of the webpage having exceeded a predetermined threshold based at least in part on one or more of the compatibility functions of the one or more edges. The acts further can include sending instructions to display the webpage based at least in part on the probability of the webpage having exceeded the predetermined threshold.

Various embodiments include a method. The method can include modeling a webpage as a random field. The random field can include an undirected graph including two or more nodes and one or more edges. Each node of the two or more nodes can include one or more placements on the webpage and can include a goodness function of one or more goodness functions associated with one or more webpage elements. Each edge of the one or more edges can include a compatibility function based at least in part on the one or more goodness functions of two different nodes of the two or more nodes associated with each edge of the one or more edges. The method also can include determining a probability of the webpage having exceeded a predetermined threshold based at least in part on one or more of the compatibility functions of the one or more edges. Additionally, the method further can include sending instructions to display the webpage based at least in part on the probability of the webpage having exceeded the predetermined threshold.

Figure 2:
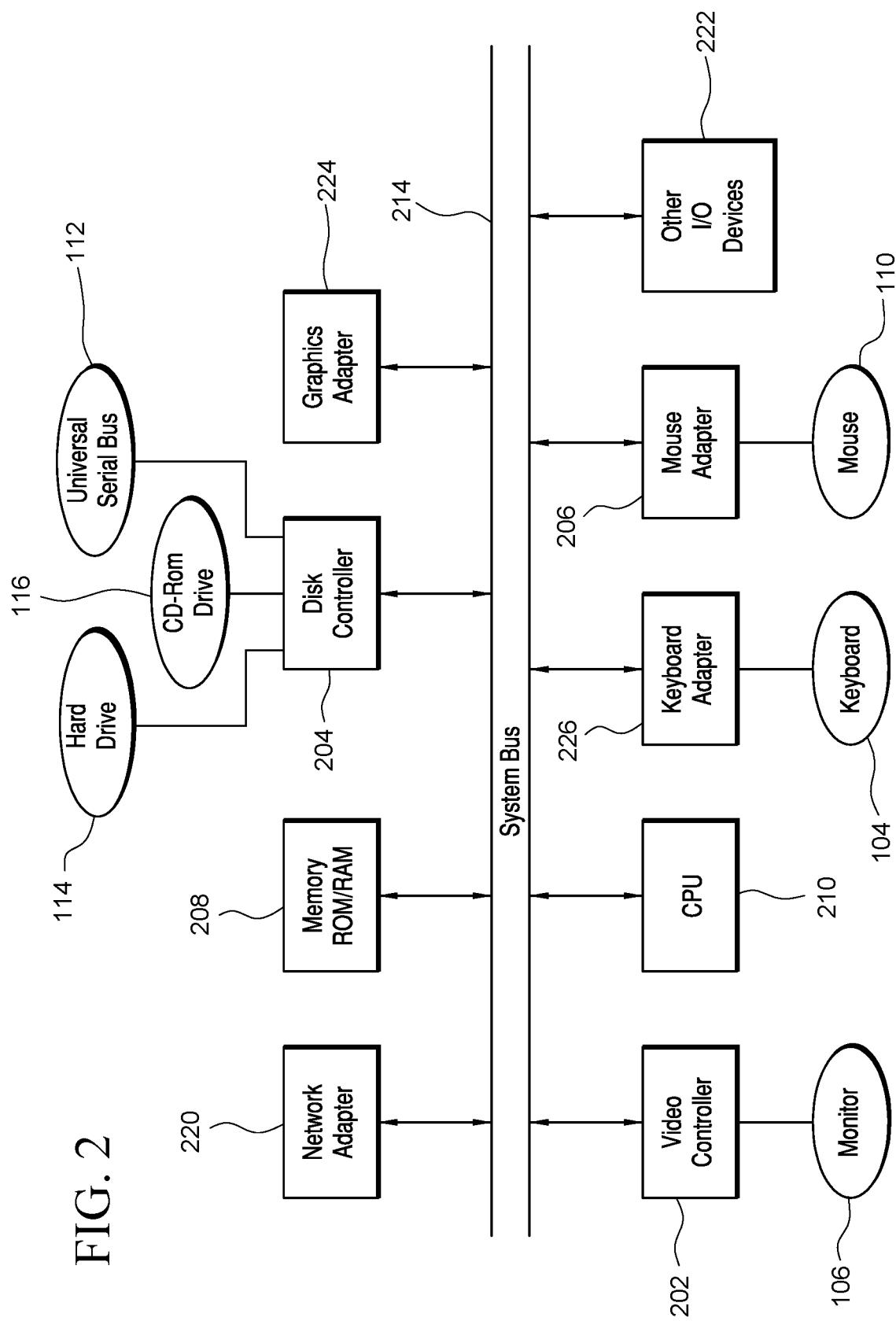
FIG. 2 illustrates a representative block diagram of exemplary elements included on the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile (e.g., non-transitory) memory, such as, for example, read only memory (ROM) and/or (ii) volatile (e.g., transitory) memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. The memory storage module(s) of the various embodiments disclosed herein can comprise memory storage unit 208, an external memory storage drive (not shown), such as, for example, a USB-equipped electronic memory storage drive coupled to universal serial bus (USB) port 112 (FIGS. 1-2), hard drive 114 (FIGS. 1-2), a CD-ROM and/or DVD for use with a CD-ROM and/or DVD drive 116 (FIGS. 1-2), floppy disk for use with a floppy disk drive (not shown), an optical disc (not shown), a magneto-optical disc (now shown), magnetic tape (not shown), etc. Further, non-volatile or non-transitory memory storage module(s) refer to the portions of the memory storage module(s) that are non-volatile (e.g., non-transitory) memory.

In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
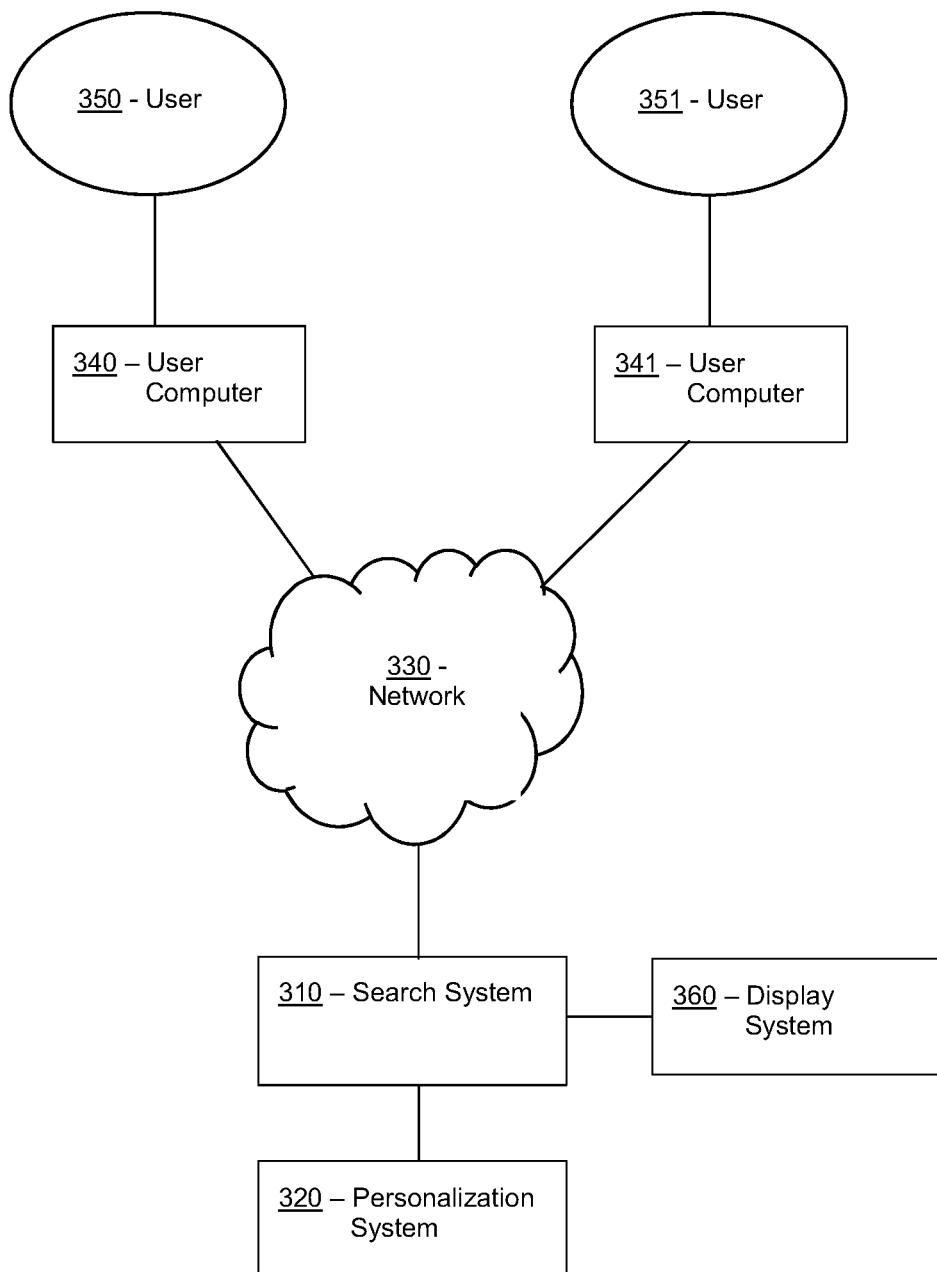
FIG. 3 illustrates a representative block diagram of a system, according to an embodiment.

Skipping ahead now in the drawings, FIG. 3 illustrates a representative block diagram of a system 300, according to an embodiment. System 300 is merely exemplary and embodiments of the system are not limited to the embodiments presented herein. System 300 can be employed in many different embodiments or examples not specifically depicted or described herein. In some embodiments, certain elements or modules of system 300 can perform various methods and/or activities of those methods. In these or other embodiments, the methods and/or the activities of the methods can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In a number of embodiments, system 300 can comprise a search system 310, a personalization system 320, and a display system 360. In some embodiments, search system 310, personalization system 320, and display system 360 can each be a computer system 100 (FIG. 1), as described above, and can each be a single computer, a single server, or a cluster or collection of computers or servers. In some embodiments, search system 310 and/or personalization system 320 can be in communication with an inventory database (not shown) which can track distinct items (e.g., stock keeping units (SKUs)), and images of the distinct items, in a product catalog, which can be ordered through the online retailer and which can be housed at one or more warehouses. In many embodiments, warehouses can comprise brick-and-mortar stores, distribution centers, and/or other storage facilities.

In many embodiments, search system 310, personalization system 320, and/or display system 360 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) of search system 310, personalization system 320, and/or display system 360 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of search system 310, personalization system 320, and/or display system 360. In a similar manner, the processing module(s) and the memory storage module(s) can be local and/or remote to each other.

In many embodiments, search system 310 and/or display system 360 can be configured to communicate with one or more user computers 340 and 341. In some embodiments, user computers 340 and 341 also can be referred to as customer computers. In some embodiments, search system 310 and/or display system 360 can communicate or interface (e.g. interact) with one or more customer computers (such as user computers 340 and 341) through a network 330. In some embodiments, network 330 can be an internet, an intranet that is not open to the public, an email system, and/or a texting system. In many embodiments, network 330 can comprise one or more electronic transmission channels. In many embodiments, the electronic transmission channels can comprise an email, a text message, and/or an electronic notice or message. Accordingly, in many embodiments, search system 310 and/or display system 360 (and/or the software used by such systems) can refer to a back end of system 300 operated by an operator and/or administrator of system 300, and user computers 340 and 341 (and/or the software used by such systems) can refer to a front end of system 300 used by one or more users 350 and 351, respectively. In some embodiments, users 350 and 351 also can be referred to as customers, in which case, user computers 340 and 341 can be referred to as customer computers. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, search system 310, personalization system 320, and/or display system 360 also can be configured to communicate with one or more databases. The one or more database can comprise a product database that contains information about products, items, or SKUs sold by a retailer. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between search system 310, personalization system 320, display system 360, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.)

Figure 4:
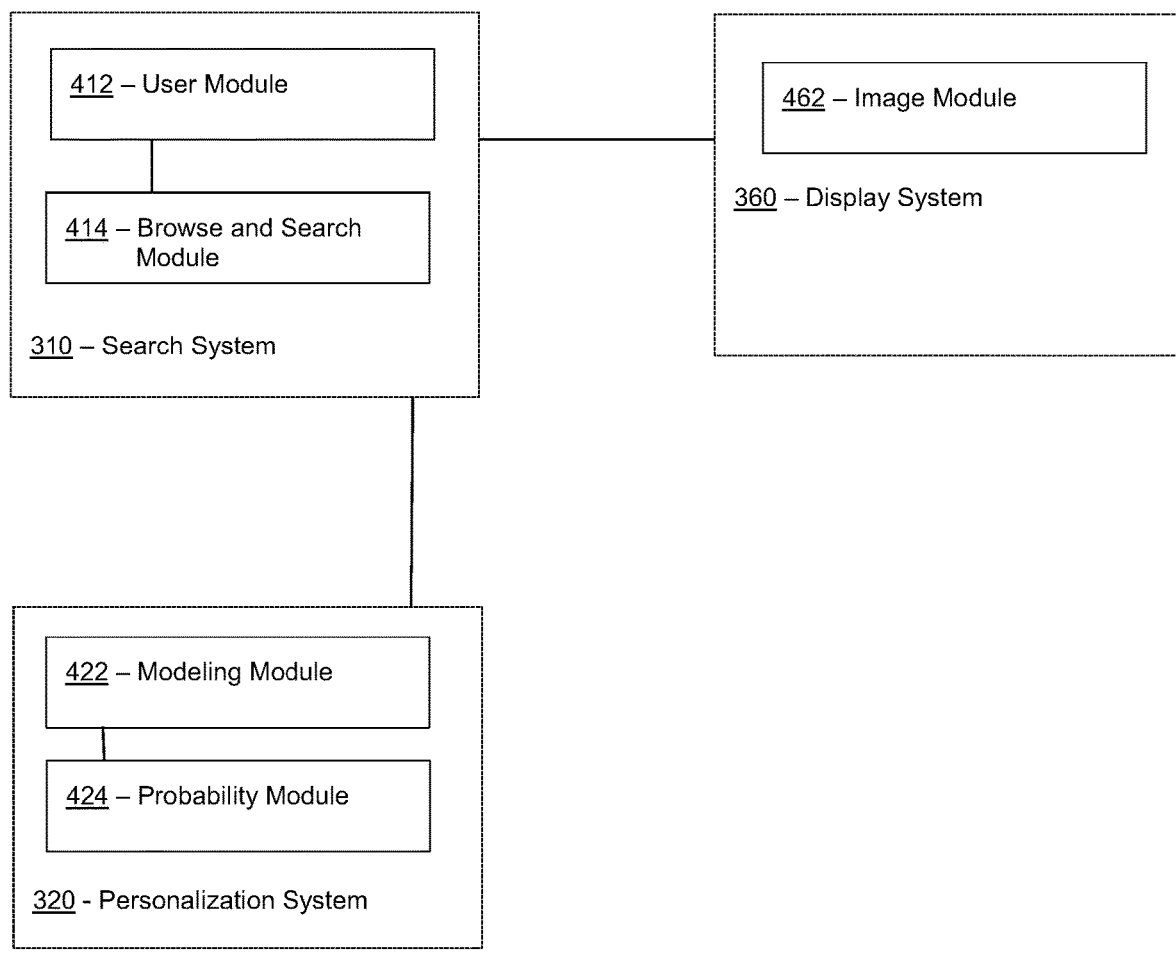
FIG. 4 illustrates a representative block diagram of a portion of the system of FIG. 3, according to an embodiment.

Turning ahead in the drawings, FIG. 5 illustrates a flow chart for a method 500, according to an embodiment. Method 500 is merely exemplary and is not limited to the embodiments presented herein. Method 500 can be employed in many different embodiments or examples not specifically depicted or described herein. In some embodiments, the activities of method 500 can be performed in the order presented. In other embodiments, the activities of method 500 can be performed in any suitable order. In still other embodiments, one or more of the activities of method 500 can be combined or skipped. In many embodiments, system 300 (FIG. 3) can be suitable to perform method 500 and/or one or more of the activities of method 500. In these or other embodiments, one or more of the activities of method 500 can be implemented as one or more computer instructions configured to run at one or more processing modules and configured to be stored at one or more non-transitory memory storage modules 412, 414, 422, 424, and/or 462 (FIG. 4). Such non-transitory memory storage modules can be part of a computer system such as search system 310 (FIGS. 3 & 4), personalization system 320 (FIGS. 3 & 4), and/or display system 360 (FIGS. 3 & 4). The processing module(s) can be similar or identical to the processing module(s) described above with respect to computer system 100 (FIG. 1).

In many embodiments, method 500 can be a method of whole page personalization to personalize a web page based on user intent, information from a search query (e.g., search terms) and/or other item activity. For example, method 500 can comprise an activity 505 of modeling a webpage as a random field, wherein the random field comprises an undirected graph. In some embodiments, activity 505 can comprise a maximum entropy model. In many embodiments, the undirected graph can comprise one or more nodes and one or more edges. In many embodiments, each edge of the one or more edges is between two different nodes of the one or more nodes, and each node of the one or more nodes can comprise one or more placements on the webpage and a goodness function of one or more goodness functions associated with one or more webpage modules. In some embodiments, the goodness function can comprise a probabilistic model learnt from historical session data (e.g., historical data described below). In many embodiments, each edge of the or one more edges can comprise a compatibility function based at least in part on the one or more goodness functions of the two different nodes of the one or more nodes associated with each edge of the one or more edges. In some embodiments, the compatibility function can comprise a probabilistic model learnt from historical session data (e.g., historical data described below). In some embodiments, activity 505 can comprise using item activity statistics from the user and/or other users (e.g., page views, item clicks, item add-to-carts, and/or item purchases) in a taxonomy (e.g., Baby, Baby/Nursery, Baby/Nursery/Furniture, Baby/Nursery/Furniture/Cribs). In many embodiments, each of the item activity statistics can be computed across various time resolutions (e.g., over a year, 6 months, month, week, day and/or hour). Such temporal features can provide additional information to the modeling of the undirected graph (e.g., a purchase of a television in the last 30 days is different from buying a consumable in the last month, as the consumable offers an opportunity for a replenishment themed campaign, while the former can be a cross sell opportunity (e.g., to promote home theatre systems and console tables)). In many embodiments, activity 505 can further comprise modeling the webpage based at least in part on a user profile (described below) of the user and/or other users.

In many embodiments, method 500 can further comprise an activity 510 of determining a probability of the webpage having exceeded a predetermined threshold to likely cause a user to take an action (e.g., view a product on the webpage, click on the product on the webpage, add the product to a checkout cart, and/or purchase the product) based at least in part on the one or more compatibility functions. In some embodiments, activity 510 can comprise determining a probability of the webpage having exceeded a predetermined threshold based at least in part on the one or more compatibility functions by: activity 515 of determining a first placement of the one or more placements of a first webpage module of the one or more webpage modules; and activity 520 determining a second placement of the one or more placements of a second webpage module of the one or more webpage modules. In many embodiments, the one or more webpage modules can comprise an advertisement, an advertisement banner, a header message, a point of view, a vertical banner, an item carousel, a search recommendation, or an item recommendation.

In some embodiments, the one or more placements comprise contiguous placements of the one or more webpage modules on the webpage. In some embodiments, activity 510 further can comprise determining approximately 1-100 additional placements of the one or more placements of one or more additional webpage modules of the one or more webpage modules. In many embodiments, the one or more placements comprise contiguous placements of the one or more webpage modules on the webpage. In some embodiments, the predetermined threshold can be based at least in part on the compatibility score of each of the one or more edges. In some embodiments, the predetermined threshold comprises a compatibility score of at least approximately 0.5 or 50%. In some embodiments, the compatibility score of each the one or more edges can be based at least in part on an engagement value, the engagement value comprising at least one of: a click rate (e.g., a rate at which the user clicks on one or more items on the webpage), a bounce rate (e.g., a rate at which the user leaves a webpage to go to a different webpage, or a rate at which the user leaves one or more items such as clicking a first item and then leaving the first item by clicking a second item), an add to cart rate (e.g., a rate at which the user adds an item to cart after viewing the item), or a purchase rate (e.g., a rate at which the user purchases the item after viewing it and/or after adding the item to the cart).

In some embodiments, the model of activity 505 can be trained using historical data, (e.g., historical webservice logs) to generate positive and negative samples. In some embodiments, to improve conversion rate (e.g., viewing an item to purchasing the item), positive labels can be used as a set of all sessions which had a conversion related activity in a relevant category after seeing a personalized webpage (e.g., a user was exposed to a personalized electronics experience and buys or adds to cart a camera in the same browse session). In many embodiments, a maximum likelihood estimation can be used to estimate the maximum entropy model. In many embodiments, a preferred parameter configuration can be determined by maximizing a conditional log probability of observing the training data (e.g., the historical data)) x, over the time resolution or time period t:

$$\operatorname{argmax}_w \sum_t \log p(c_t \mid x_t, w) = \operatorname{argmax}_w \sum_t \frac{1}{1 + \exp(-w^T x)}; \quad \text{(Equation 1)}$$

where $c_t$ is a random variable denoting the desired discrete response, $P(c_t|x_t|w)$ is the probability of seeing the desired response, given observations $x_t$ and the model parameters w, $P(c_t=1|x_t|w)$ is the probability of conversion given observations $x_t$ and model parameters w, and w denotes the model parameters that can be learned from the historical data. In some embodiments, an array of real valued weights can indicate the importance of features (in the array) $x_t$. In many embodiments, in case of conversion, $c_t=1$ would indicate a conversion event, and $c_t=0$ otherwise, In some embodiments, activity 510 of determining the probability of the webpage is further based at least in part on a user profile of the user and/or other users. In various embodiments, the user profile of the user and/or other users can comprise demographic information associated with the related one or more users, likes and dislikes associated with the related one or more users, and/or shopping, pickup, and delivery preferences associated with the related one or more users.

In some embodiments, activity 510 further can comprise determining the probability of the webpage by using the formula in Equation 2:

$$P(\text{page}) = \frac{1}{Z} \prod_i \emptyset_i(x) \prod_{i,j:\text{Edge}(i,j)} \varphi_{i,j}(x, y); \quad \text{(Equation 2)}$$

wherein: P(page) is the probability of the webpage, Z is a normalization constant (e.g., a partition function), i is a first node of the one or more nodes, j is a second node of the one or more nodes, x is a first placement of the one or more placements, $\emptyset_i(x)$ is a first goodness function of the one or more goodness functions of the first node at the first placement of the one or more placements, $\Pi_i \emptyset_i(x)$ is the product of the goodness function of the first node, y is a second placement of the one or more placements of the second node of the one or more nodes, $\varphi_{i,j}(x, y)$ is the compatibility function, and $\Pi_{i,j:Edge(i,j)} \varphi_{i,j}(x, y)$ is the product of the compatibility of the first placement of the one or more placements and the second placement of the one or more placements.

Figure 6:
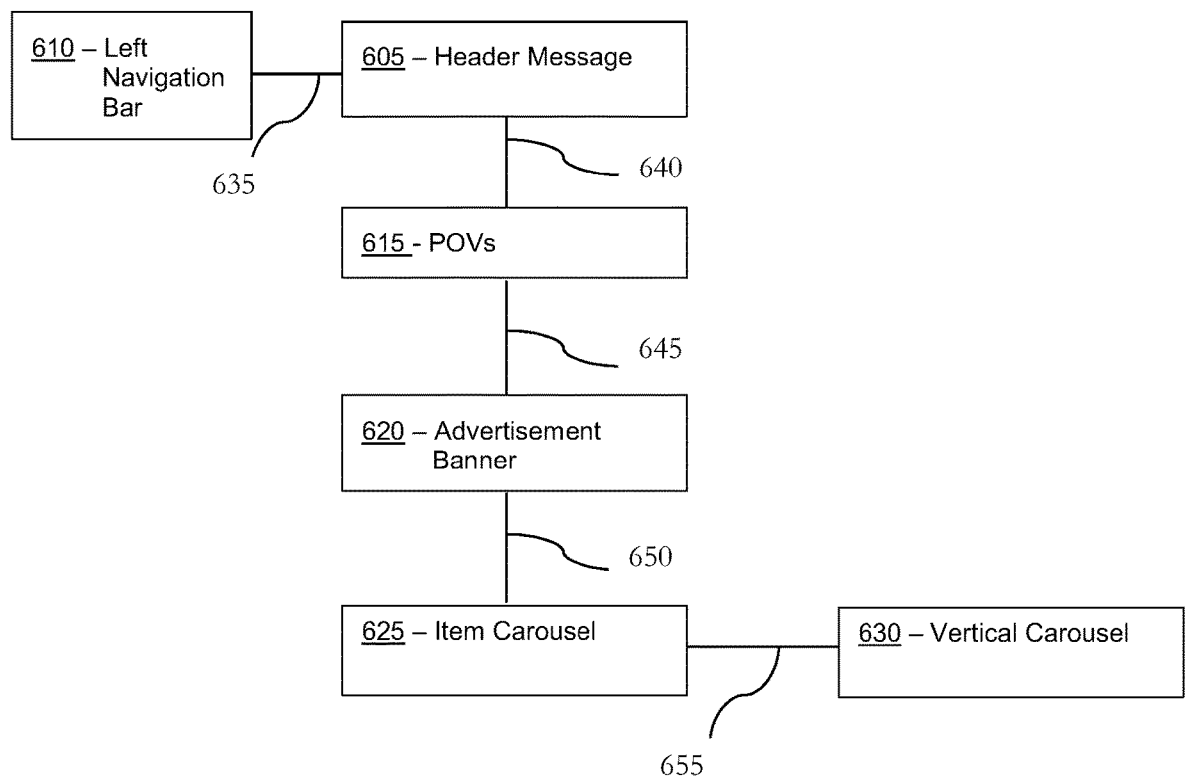
FIG. 6 illustrates a webpage as a random field, according to an embodiment.

Turning briefly to FIG. 6, FIG. 6 illustrates a webpage 600 and/or an undirected graph according to many embodiments. In some embodiments, webpage 600 can comprise two or more placements, or available spots, for one or more webpage modules. In some embodiments, for example, from top to bottom and left to right, webpage 600 can comprise a first placement 605, a second placement 610, a third placement 615, a fourth placement 620, a fifth placement 625, and a sixth placement 630. In other embodiments, a webpage (e.g., webpage 600) can comprise 1-100 placements in different configurations. In some embodiments, the one or more placements or nodes of webpage 600 can comprise associated one or more edges between the one or more placements (e.g., edges 635, 640, 645, 650, and 655).

In some embodiments, first placement 605 can comprise a header message webpage module, second placement 610 can comprise a left navigation bar webpage module, third placement 615 can comprise a point of view webpage module, fourth placement 620 can comprise an advertisement banner webpage module, fifth placement 625 can comprise an item carousel webpage module, and sixth placement 630 can comprise a vertical carousel webpage module. In many embodiments, a node of the undirected graph can comprise a website placement (e.g., first placement 605) and a goodness function of one or more goodness functions associated with the webpage module (e.g., header message) of the one or more webpage modules. In many embodiments, each edge between two nodes (e.g., edge 635) comprises a compatibility function based at least in part on the one or more goodness functions of the two different nodes (e.g., first placement 605 and second placement 610) of the one or more nodes associated with each edge of the one or more edges.

Returning to FIG. 5, in many embodiments, method 500 can further comprise an activity 525 of facilitating display of the webpage based at least in part on the probability of the webpage. The one or more webpage modules can be arranged on the webpage pursuant to a ranking of one or more webpage modules, and the ranking can be based, at least in part, on the compatibility score of each of the one or more edges and/or the webpage personalization described herein.

In some embodiments, method 500 can further comprise receiving an affinity score of the user for each of one or more categories (e.g., a specific category in an item taxonomy and/or a custom segment), genders, brands, locations, and/or other custom segments (e.g., an allergy, such as gluten free, and/or preferences, such as organic), the one or more webpage modules comprising the one or more categories. In some embodiments, the affinity score of the user for each of one or more categories can be based at least in part on the user profile of the user and/or recent item activity (e.g., one or more search queries by the user, item clicks by the user, and/or item purchases by the user) of the user.

In many embodiments, method 500 further can comprise receiving a search query from a search from a user. In some embodiments, activity 510 (described above) further can comprise determining the probability of the webpage is further based at least in part on the search query of the user. In some embodiments, the search query is received from the user during a browse session. In some embodiments, the browse session can comprise a time period spent on a website and/or other third party websites. In some embodiments, the time period can be approximately 1 second to approximately 1 hour. In some embodiments, the time period can be the time that the user is logged into a session. In some embodiments, the time period can be from when the user logs into a session to when the user closes a browser. In some embodiments, receiving the search query from the search by the user can comprise receiving the search query during a time window. In some embodiments, the time window can comprise the browse session time period. In some embodiments, the time window can comprise a number of item activities associated with the browse session. In various embodiments, the item activity associated with the browse session can comprise at least one of a view of an item of the item set, a click on the item of the item set, an add-to-cart of the item of the item set, or a purchase of the item of the item set. In a number of embodiments, the time window can comprise a number of actions, subsequent to the search query, associated with item activity associated with the browse session (e.g., a number of clicks on one or more items, a number of views of one or more items, a number of items added to the checkout cart, and/or a number of purchases of one or more items). In some embodiments the number of subsequent actions can comprise a combination of a number of item activities. In some embodiments, the number of subsequent actions can comprise approximately 1 to 100 item activities.

In some embodiments, method 500 further can comprise an activity of receiving one or more previous search queries from a search database, the one or more previous search queries related to the search query. An advantage of the activity of receiving one or more previous search queries from a search database, the one or more previous search queries related to the search query, can comprise expanding a source of information associated with previous search queries for one or more searches related to the search query. The source of information can comprise when an other user searched for a related search query and the item activity associated to the other user's search for the related search query. In some embodiments, the user profile of the user and/or other users can be updated based at least in part on the search query of the user and/or other users.

In some embodiments of method 500, as an example, assuming 3 webpage modules comprising 3 item carousels are to be displayed in a webpage to the user. In many embodiments, the 3 carousels can be selected from a set of category-based item carousels. First, an affinity of the user to all carousels in the set of category-based item carousels can be received from a machine learning algorithm. In many embodiments, the affinity of the user to all carousels in the set of category-based item carousels can be received with the following values:

Apparel 0.01
Auto 0.12
Baby 0.60
Electronics 0.03
Food 0.08
Home 0.02
Household 0.01
Pets 0.01
Toys 0.11
VG (Video Games) 0.01

In the first iteration, method 500 can select the carousel with a highest affinity for the top placement (e.g., first placement 605 (FIG. 6)) which is the "Baby" carousel in this example. For the second placement (e.g., second placement 610 (FIG. 6)), method 500 can find a carousel with a high affinity for the user, and also is compatible with the first selected carousel in the first placement. The compatibility score across categories can be found using a compatibility matrix:

|  | Apparel | Auto | Baby | Electronics | Food | Home | Household | Pets | Toys | VG |
|---|---|---|---|---|---|---|---|---|---|---|
| Apparel | — | 0.1 | 0.25 | 0.1 | 0.05 | 0.15 | 0.1 | 0.1 | 0.05 | 0.1 |
| Auto | 0.1 | — | 0.05 | 0.3 | 0.1 | 0.1 | 0.1 | 0.1 | 0.05 | 0.1 |
| Baby | 0.25 | 0.05 | — | 0.05 | 0.15 | 0.1 | 0.05 | 0.05 | 0.25 | 0.05 |
| Electronics | 0.1 | 0.3 | 0.05 | — | 0.05 | 0.05 | 0.05 | 0.05 | 0.1 | 0.25 |
| Food | 0.05 | 0.1 | 0.15 | 0.05 | — | 0.15 | 0.2 | 0.1 | 0.1 | 0.1 |
| Home | 0.15 | 0.1 | 0.1 | 0.05 | 0.15 | — | 0.2 | 0.15 | 0.05 | 0.05 |
| Household | 0.1 | 0.1 | 0.05 | 0.05 | 0.2 | 0.2 | — | 0.2 | 0.05 | 0.05 |
| Pets | 0.1 | 0.1 | 0.05 | 0.05 | 0.1 | 0.15 | 0.2 | — | 0.15 | 0.1 |
| Toys | 0.05 | 0.05 | 0.25 | 0.1 | 0.1 | 0.05 | 0.05 | 0.15 | — | 0.2 |
| VG | 0.1 | 0.1 | 0.05 | 0.25 | 0.1 | 0.05 | 0.05 | 0.1 | 0.2 | — |

The carousel with highest affinity among the remaining carousels is "Auto," however it has a low compatibility score with "Baby," 0.05. In many embodiments, new affinity scores can be determined by multiplying the first affinity scores with the corresponding compatibility score and normalizing to find the new affinity scores:

Apparel 0.0472
Auto 0.1132
Electronics 0.0283
Food 0.2264
Home 0.0377
Household 0.0094
Pets 0.0094
Toys 0.5189
VG (Video Games) 0.0094

After normalizing, "Toys" carousel has the highest score and selected to be the second carousel to display on the webpage at the second placement. Again iterating once more for the remaining carousels to find a carousel for the third placement, the affinity scores can be updated by considering the compatibility with "Toys":

Apparel 0.0222
Auto 0.2667
Electronics 0.1333
Food 0.3556
Home 0.0444
Household 0.0222
Pets 0.0667
VG (Video Games) 0.0889

Using the prior affinity and compatibility scores, method 500 can comprise selecting the "Food" carousel based on the updated affinity scores.

Returning to FIG. 4, FIG. 4 illustrates a block diagram of a portion of system 300 comprising search system 310, personalization system 320, and/or display system 360, according to the embodiment shown in FIG. 3. Each of search system 310, personalization system 320, and/or display system 360 is merely exemplary and is not limited to the embodiments presented herein. Each of search system 310, personalization system 320, and/or display system 360 can be employed in many different embodiments or examples not specifically depicted or described herein. In some embodiments, certain elements or modules of search system 310, personalization system 320, and/or display system 360 can perform various procedures, processes, and/or acts. In other embodiments, the procedures, processes, and/or acts can be performed by other suitable elements or modules.

In many embodiments, search system 310 can comprise non-transitory memory storage modules 412 and 414, personalization system 320 can comprise non-transitory memory storage modules 422 and 424, and display system 360 can comprise a non-transitory memory storage module 462. Memory storage module 412 can be referred to as a user module 412, and memory storage module 414 can be referred to as a browse and search module 414. Memory storage module 422 can be referred to as a modeling module 422, and memory storage module 424 can be referred to as a probability module. Memory storage module 462 can be referred to as an image module 462.

In many embodiments, user module 412 can store computing instructions configured to run on one or more processing modules and perform one or more acts of methods 500 (FIG. 5) (e.g., activity 505).

In some embodiments, browse and search module 414 can store computing instructions configured to run on one or more processing modules and perform one or more acts of methods 500 (FIG. 5) (e.g., activity 505).

In many embodiments, modeling module 422 can store computing instructions configured to run on one or more processing modules and perform one or more acts of methods 500 (FIG. 5) (e.g., activity 505).

In many embodiments, probability module 424 can store computing instructions configured to run on one or more processing modules and perform one or more acts of methods 500 (FIG. 5) (e.g., activity 510, activity 515, and/or activity 520).

In some embodiments, image module 462 can store computing instructions configured to run on one or more processing modules and perform one or more acts of methods 500 (FIG. 5) (e.g., activity 525).

Although systems and methods for whole page personalization have been described above, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-6 may be modified, and that the foregoing discussion of certain of these embodiments does not necessarily represent a complete description of all possible embodiments. For example, one or more of the activities of FIG. 5 may include different activities and/or be performed by many different modules, in many different orders.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
one or more processors; and
one or more non-transitory computer-readable media storing computing instructions configured to run on the one or more processors and perform:
modeling a webpage as a random field, wherein the random field comprises an undirected graph comprising:
two or more nodes; and
one or more edges,
wherein:
each node of the two or more nodes comprises:
one or more placements on the webpage; and
a goodness function of one or more goodness functions associated with one or more webpage elements; and
each edge of the one or more edges comprises a compatibility function based at least in part on the one or more goodness functions of two different nodes of the two or more nodes associated with each edge of the one or more edges;
determining a probability of the webpage having exceeded a predetermined threshold based at least in part on one or more of the compatibility functions of the one or more edges, wherein the one or more compatibility functions comprise (i) a product of a compatibility of a first placement of a first node of the two or more nodes and a second placement of a second node of the two or more nodes, and (ii) the compatibility function of the one or more compatibility functions of an edge of the one or more edges between the first node at the first placement and the second node at the second placement, wherein the one or more placements comprise the first and second placements; and
sending instructions to display the webpage based at least in part on the probability of the webpage having exceeded the predetermined threshold.

2. The system of claim 1, wherein:
the one or more webpage elements further comprise at least one of:
an advertisement;
a search recommendation; or
an item recommendation.

3. The system of claim 1, wherein:
the goodness function further comprises a probabilistic model learned from historical session data to generate positive samples and negative samples.

4. The system of claim 1, wherein:
the compatibility function of each of the one or more edges provides a compatibility score based at least in part on an engagement value, the engagement value comprising at least one of:
a click rate,
an add to cart rate, or
a purchase rate.

5. The system of claim 1, wherein the computing instructions are further configured perform:
receiving an affinity score of a user for each of one or more categories, the one or more webpage elements comprising the one or more categories.

6. The system of claim 1, wherein:
determining the probability of the webpage having exceeded the predetermined threshold is further based at least in part on a search query of a user.

7. The system of claim 1, wherein:
determining the probability of the webpage having exceeded the predetermined threshold is further based at least in part on a user profile of a user.

8. The system of claim 1, wherein:
the one or more placements comprise contiguous placements of the one or more webpage elements on the webpage.

9. The system of claim 1, wherein the computing instructions are further configured to perform:
determining the first placement of the one or more placements of the first node of a first webpage element of the one or more webpage elements; and
determining the second placement of the one or more placements of the second node of a second webpage element of the one or more webpage elements.

10. The system of claim 9, wherein:
determining the probability of the webpage having exceeded the predetermined threshold is determined using a formula:

$$P(\text{page}) = \frac{1}{Z} \prod_i \emptyset_i(x) \prod_{i,j:Edge(i,j)} \varphi_{i,j}(x, y),$$

wherein:
P(page) is the probability of the webpage having exceeded the predetermined threshold;
Z is a normalization constant;
i is a first node of the two or more nodes;
j is a second node of the two or more nodes;
x is the first placement of the first node;
$\emptyset_i(x)$ is the goodness function of the one or more goodness functions of the first node at the first placement;
y is the second placement of the one or more placements of the second node; and
$\varphi_{i,j}(x, y)$ is the compatibility function of an edge of the one or more edges between the first node at the first placement and the second node at the second placement.

11. A method comprising:
modeling a webpage as a random field, wherein the random field comprises an undirected graph comprising:
two or more nodes; and
one or more edges,
wherein:
each node of the two or more nodes comprises:
one or more placements on the webpage; and
a goodness function of one or more goodness functions associated with one or more webpage elements; and
each edge of the one or more edges comprises a compatibility function based at least in part on the one or more goodness functions of two different nodes of the two or more nodes associated with each edge of the one or more edges;
determining a probability of the webpage having exceeded a predetermined threshold based at least in part on one or more of the compatibility functions of the one or more edges, wherein the one or more compatibility functions comprise (i) a product of a compatibility of a first placement of a first node of the two or more nodes and a second placement of a second node of the two or more nodes, and (ii) the compatibility function of the one or more compatibility functions of an edge of the one or more edges between the first node at the first placement and the second node at the second placement, wherein the one or more placements comprise the first and second placements; and
sending instructions to display the webpage based at least in part on the probability of the webpage having exceeded the predetermined threshold.

12. The method of claim 11, wherein:
the one or more webpage elements further comprises at least one of:
an advertisement;
a search recommendation; or
an item recommendation.

13. The method of claim 11, wherein:
the goodness function further comprises a probabilistic model learned from historical session data to generate positive samples and negative samples.

14. The method of claim 11, wherein:
the compatibility function of each of the one or more edges provides a compatibility score based at least in part on an engagement value, the engagement value comprising at least one of:
a click rate,
an add to cart rate, or
a purchase rate.

15. The method of claim 11, further comprising:
receiving an affinity score of a user for each of one or more categories, the one or more webpage elements comprising the one or more categories.

16. The method of claim 11, wherein:
determining the probability of the webpage having exceeded the predetermined threshold is further based at least in part on a search query of a user.

17. The method of claim 11, wherein:

determining the probability of the webpage having exceeded the predetermined threshold is further based at least in part on a user profile of a user.

18. The method of claim 11, wherein:

the one or more placements comprise contiguous placements of the one or more webpage elements on the webpage.

19. The method of claim 11, further comprising:

determining the first placement of the one or more placements of the first node of a first webpage element of the one or more webpage elements; and determining the second placement of the one or more placements of the second node of a second webpage element of the one or more webpage elements.

20. The method of claim 19, wherein:

determining the probability of the webpage having exceeded the predetermined threshold is determined using a formula:

$$P(\text{page}) = \frac{1}{Z} \prod_i \emptyset_i(x) \prod_{i,j:Edge(i,j)} \varphi_{i,j}(x, y),$$

wherein:
- P(page) is the probability of the webpage having exceeded the predetermined threshold;
- Z is a normalization constant;
- i is a first node of the two or more nodes;
- j is a second node of the two or more nodes;
- x is the first placement of the first node;
- $\emptyset_i(x)$ is the goodness function of the one or more goodness functions of the first node at the first placement;
- y is the second placement of the one or more placements of the second node; and
- $\varphi_{i,j}(x, y)$ is the compatibility function of an edge of the one or more edges between the first node at the first placement and the second node at the second placement.

* * * * *